United States Patent
Hugenberg et al.

(10) Patent No.: US 9,778,484 B2
(45) Date of Patent: Oct. 3, 2017

(54) OPTICAL ELEMENT HAVING A COATING OF HIGH DIFFUSIVITY

(71) Applicant: Carl Zeiss Vision International GmbH, Aalen (DE)

(72) Inventors: Norbert Hugenberg, Aalen (DE); Markus Haidl, Aalen (DE); Bernhard von Blanckenhagen, Aalen (DE); Lothar Holz, Unterkochen (DE); Stefan Kraus, Aalen (DE); Frank Macionczyk, Oberkochen (DE); Michael Krause, Ulm (DE); Erwin Green, Aalen (DE); Karl-Heinz Winter, Essingen (DE); Thomas Gloege, Aalen (DE); Silvia Faul, Aalen (DE); Anja Petereit, Abtsgmuend (DE); Bin Peng, Aalen (DE); Joerg Puetz, Aslen (DE); Patrick Kiefer, Eisingen (DE); Adalbert Hanssen, Aalen (DE); Michael Krieger, Aalen (DE); Andreas Neuffer, Asperg (DE); Marc Stroisch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 414 days.

(21) Appl. No.: 14/270,923

(22) Filed: May 6, 2014

(65) Prior Publication Data

US 2014/0327876 A1 Nov. 6, 2014

(30) Foreign Application Priority Data

May 6, 2013 (DE) .................. 10 2013 208 310

(51) Int. Cl.
*G02C 3/00* (2006.01)
*G02C 7/02* (2006.01)
(Continued)

(52) U.S. Cl.
CPC ............ *G02C 7/02* (2013.01); *G02B 1/105* (2013.01); *G02B 1/12* (2013.01); *G02C 7/022* (2013.01)

(58) Field of Classification Search
CPC .......... G02B 1/04; G02B 1/105; G02B 5/305; G02B 1/10; G02B 1/18; G02B 1/14;
(Continued)

(56) References Cited

U.S. PATENT DOCUMENTS 5,015,523 A * 5/1991 Kawashima ..... B29D 11/00009
427/162
5,699,189 A * 12/1997 Murphy .................. C03C 17/28
359/601
(Continued)

FOREIGN PATENT DOCUMENTS

EP 0 698 798 A2 2/1996

OTHER PUBLICATIONS

Ma, K. et al, "Investigation of surface energy for organic light emitting polymers and indium tin oxide", Thin Solid Films 371 (2000), pp. 140 to 147, Elsevier Science S.A.
(Continued)

*Primary Examiner* — Ricky Mack
*Assistant Examiner* — Daniele Manikeu
(74) *Attorney, Agent, or Firm* — Walter Ottesen, P.A.

(57) ABSTRACT

An optical element has a substrate body made from transparent plastic and a coating having multiple layers. The coating includes a hard lacquer layer adjoining the substrate. The coating has a diffusivity ensuring the absorption of water molecules passing through the coating in the substrate and the release of water molecules from the substrate through the coating from an air atmosphere on that side of the coating facing away from the substrate with a flow density which, proceeding from the equilibrium state of the
(Continued)

quantity of water molecules absorbed in the substrate in an air atmosphere at 23° C. and 50% relative humidity, brings the setting of the equilibrium state of the quantity of water molecules absorbed in the substrate in an air atmosphere at 40° C. and 95% relative humidity within an interval not more than 10 h longer than for setting this equilibrium under corresponding conditions with an identical uncoated substrate.

27 Claims, 7 Drawing Sheets

(51) Int. Cl.
    *G02B 1/10*     (2015.01)
    *G02B 1/12*     (2006.01)

(58) Field of Classification Search
    CPC ......... G02B 1/11; G02B 1/111; G02B 5/0294; G02B 1/041; G02B 27/0006; G02F 1/133504; G02F 2201/38
    USPC .......... 359/489.04, 507, 580, 586, 614, 642; 351/159.33, 159.04, 159.57; 427/162, 427/164, 541; 428/474.4
    See application file for complete search history.

(56) References Cited

U.S. PATENT DOCUMENTS

| | | |
|---|---|---|
| 2009/0053465 A1 | 2/2009 | Scherg et al. |
| 2010/0027123 A1* | 2/2010 | Imai ................... G02B 1/115 359/586 |
| 2010/0183805 A1* | 7/2010 | Nieminen ........... B29C 66/5326 427/162 |
| 2011/0058142 A1 | 3/2011 | Berit-Debat et al. |
| 2011/0305827 A1 | 12/2011 | Boilot et al. |
| 2012/0019915 A1* | 1/2012 | Yan ..................... B32B 33/00 359/586 |
| 2012/0045577 A1* | 2/2012 | Feret ................... C08G 65/336 427/162 |
| 2012/0081792 A1* | 4/2012 | Neuffer ................. G02B 1/041 359/601 |
| 2012/0154916 A1* | 6/2012 | Nishimoto ............. G02B 1/115 359/580 |

OTHER PUBLICATIONS

Schulz, U. et al, "Near-infrared spectroscopy for monitoring water permeability of optical coatings on plastics", Applied Optics, vol. 36, No. 4, Feb. 1, 1997, pp. 862 to 865, Optical Society of America.
Weiss, C., "Metallisierung von Folien auf der Basis von Polyetheretherketon (PEEK) fuer flexible Schaltungstraeger", dissertation, Friedrich-Alexander University Erlangen-Nuremberg (2002), published Jul. 8, 2004. The method described on pp. 54 and 55. (Abstract in English).
English translation and the Office action of the German Patent Office dated Oct. 8, 2013 in German patent application 10 2013 208 310.6 on which the claim of priority is based.

* cited by examiner

OPTICAL ELEMENT HAVING A COATING OF HIGH DIFFUSIVITY

CROSS REFERENCE TO RELATED APPLICATION

This application claims priority of German patent application no. 10 2013 208 310.6, filed May 6, 2013, the entire content of which is incorporated herein by reference.

FIELD OF THE INVENTION

The invention relates to an optical element, in particular a spectacle lens or a spectacle lens blank, including a substrate body made from a plastic, which is transparent preferably in the visible spectral range, and including a coating having a plurality of layers. The coating includes a hard lacquer layer adjoining the substrate body.

BACKGROUND OF THE INVENTION

An optical element of this type is known in the form of an optical lens embodied as a spectacle lens for example from United States patent application publication 2012/0081792.

For optical lenses, in particular for spectacle lenses, plastic that is transparent in the visible spectral range is increasingly being used nowadays as material instead of silicate glass. Compared with silicate glass, plastic affords the advantages of a lower weight, a higher breaking strength, colorability and the possibility of providing rimless frames. One known disadvantage of optical lenses made of plastic, however, is that their surface area is highly susceptible to mechanical stresses and can easily be damaged by scratching.

In order to minimize this susceptibility to mechanical stresses and scratching in the case of optical lenses made of plastic, a coating including a hard lacquer layer, which is intended to protect the optical lens against mechanical effects, is applied to the plastic.

Furthermore, it is known to provide optical elements with an antireflection coating. Disturbing specular reflections can thus be avoided in the case of spectacle lenses. Antireflection coatings generally contain at least one layer made of an inorganic, oxidic material that is optically transparent. An antireflection coating can contain in particular a sequence of layers made of optically transparent, inorganic, oxidic material in which layers having a first refractive index and layers having a second refractive index, which second refractive index is higher than the first refractive index, are successively alternated.

Furthermore, it is known to embody an optical element with an antireflection coating which also protects against scratching. EP 0 698 798 A2 proposes for this purpose, for example, an antireflection coating containing a layer of borosilicate glass, which layer is vapor-deposited onto a precoated substrate body via a PVD (Physical Vapor Deposition) method.

In a coating on a substrate body made of plastic, defects can arise which are initiated by the absorption of water vapor or water molecules into the substrate body if the latter comes into contact with moisture, that is water or water vapor, but also with customary cleaning media such as alcohol or acetone.

In general, a coating has an at least passage-impeding, often even blocking effect for these substances with which in particular a spectacle lens comes into contact repeatedly over the course of its lifetime.

If these substances penetrate into an optical element for example on account of damage to the coating, that can have the consequence that, in the case of the optical element, the substrate body or else a layer applied thereto, such as a hard lacquer layer, for example, swells. Generally, in the case of the optical element, that then leads to local alterations of an optically active surface. On account of an individual scratch location, the optical element can thus easily be damaged in this way in a region extending over one square millimeter or else a number of square millimeters. In this region, an optically active surface of the optical element can also rise, often by 0.1 µm even by up to 1 µm.

It is true that the substances that penetrated into such a layer made of hard lacquer and/or a plastic body diffuse out again over time when the optical element is no longer exposed to the relevant substances. These diffusion processes lead to local volume changes, however, which in part are irreversible. They cause surface deformations, in particular, which, for example, not only bring about point and line patterns (warpage) on a coating, but also, in the case of spectacle lenses, can cause striations discernible to the naked eye under ambient lighting and furthermore also layer defects on account of mechanical stresses.

SUMMARY OF THE INVENTION

It is an object of the invention to provide an optical element having a permanent and at the same time scratch-resistant coating on a substrate body made of plastic. It is a further object of the invention to provide a method for making such an optical element.

The optical element of the invention includes: a substrate body made of a plastic transparent in the visual spectral region; a coating having a plurality of layers including a hard lacquer layer adjoining the substrate body and further having a first side facing away from the substrate body; the coating having a diffusivity ($D_F$) configured to ensure an absorption of water molecules passing through the coating into the substrate body and a release of water molecules from the substrate body through the coating from an air atmosphere arranged on the first side of the coating; the air atmosphere having a moisture flow density ($j_D$); the diffusivity ($D_F$) being further configured to, starting from a first equilibrium state of the amount of water molecules absorbed in the substrate body at an air atmosphere at 23° C. and 50% relative humidity, effect a setting of a second equilibrium state of the amount of water molecules absorbed in the substrate body at an air atmosphere at 40° C. and 95% relative humidity within a first time interval; and, the first time interval being at most ten hours longer than a second time interval required for a setting of the second equilibrium state starting from the first equilibrium state in an uncoated substrate body identical to the substrate body.

The method of the invention is for making an optical element or component. The method includes the steps of: providing a substrate body made from a transparent plastic; applying a coating having a plurality of layers on the substrate body, the coating including a hard lacquer layer which adjoins the substrate body and is generated by applying a sol-gel hard lacquer composition onto the substrate, the coating having a further optical layer configured as at least a part-layer of an antireflection coating and arranged on the hard lacquer layer; and, at least one of: treating the hard lacquer layer with at least one of a corona discharge, a low-pressure air plasma, and a glow discharge prior to the application of the further optical layer; depositing at least one of foreign matter and foreign structures on the hard lacquer layer prior to the application of the further optical layer; attaching foreign structures to an interior layer of the coating via at least one of laser light, particle bombardment, and printing; applying the sol-gel hard lacquer composition with fluorosurfactant as a flow control additive; and, generating a plurality of pores in the coating, in particular pores configured as holes extending from the surface of the coating facing away from the substrate up to at least the hard lacquer layer.

The inventors have recognized that, in the case of an optical element, the occurrence of defects in a coating applied on a substrate body made of plastic can be prevented by ensuring that the coating has, in particular, a permeability to water vapor or water molecules which enables the absorption and release of water molecules in the plastic body on a timescale which exceeds the timescale for the absorption and release of water molecules at the locations at which a coating is damaged, that is, the timescale for the absorption and release of water molecules when the plastic body is uncoated, by not more than approximately five-fold, that is by not more than approximately half an order of magnitude.

An optical element according to the invention can be embodied as a lens, in particular as a spectacle lens. It has a substrate body made of plastic that is transparent preferably in the visible spectral range. An optical element according to the invention has a coating having a plurality of layers. The coating includes a hard lacquer layer adjoining the substrate body.

The coating on the substrate body has a diffusivity $D_F$ which ensures the absorption or collection of water molecules passing through the coating in the substrate body and the release of water molecules from the substrate body through the coating from an air atmosphere arranged on that side of the coating which faces away from the substrate body with a moisture flow density $j_D$ which, proceeding from the equilibrium state of the quantity of the water molecules collected in the substrate body in an air atmosphere at 23° C. and 50% relative air humidity, brings about the setting of the equilibrium state of the quantity of the water molecules collected in the substrate body in an air atmosphere at 40° C. and 95% relative air humidity within a time interval which is longer by not more than a time period having the length $\Delta t=10$ h, preferably by not more than a time period having the length $\Delta t=9$ h or $\Delta t=8$ h or $\Delta t=7$ h or $\Delta t=6$ h or $\Delta t=5$ h or $\Delta t=4$ h or $\Delta t=3$ h or $\Delta t=2$ h, particularly preferably by not more than a time period having the length $\Delta t=1$ h, than the time interval required for setting this equilibrium state under corresponding conditions in the case of an uncoated substrate body identical to the substrate body.

The diffusivity $D_F$ of a coating is understood here to mean the permeability of the coating in particular to water molecules and water vapor, that is the capability of the coating to permit in particular the diffusion of water vapor and water molecules through the coating.

The diffusivity $D_F$ of a coating links the moisture flow density $j_D$ for the moisture flow penetrating through the coating with the density $C_{FS}$ of water molecules collected in the substrate body via diffusion and the density $C_{FG}$ of water molecules in the gas atmosphere on that side of the coating which faces away from the substrate body, as follows:

$$j_D = D_F(C_{FG} - \alpha C_{FS}),$$

wherein α is a constant.

Within the meaning of the invention, the quantity of the water molecules collected in the substrate body is in an equilibrium state if the number of water molecules collected into the substrate body changes by not more than 1% within 24 h.

The quantity of the water molecules collected into a substrate body can be measured gravimetrically, for example, or else, as described for instance in the publication by U. Schulz et al., Near-infrared spectroscopy for monitoring water permeability of optical coatings on plastics, Applied Optics, 862 26 (1997), can be determined by measuring an absorption spectrum for the substrate body in the infrared spectral range.

The relative air humidity is understood here to mean the ratio of the actually contained mass of water vapor in the air to the maximum possible mass of water vapor in the air. The relative air humidity is the ratio between the absolute air humidity and the maximum air humidity of air at a specific temperature T, that is the ratio of the water vapor mass $m_W$ contained in an air volume V to the maximum possible water vapor mass in the air volume V at the temperature T, if the water vapor partial pressure in the air is equal to the saturation vapor pressure of water.

The plastic of the substrate body can, for example, be a polyurethane, a polythiourethane, PMMA, a polycarbonate, a polyacrylate or a polydiethylene glycol bis(allyl carbonate) (CR 39). Furthermore, the plastic can also be a material from the MR product series from Mitsui Chemicals, for example the material MR-10®, MR-7®, MR-8® or MR-174®, or the material Trivex.

The hard lacquer layer in the optical element according to the invention is transparent preferably in the visible spectral range. It has as far as possible a refractive index which corresponds to the refractive index of the plastic of the substrate body or which is close to the refractive index, in order to ensure a good optical transmissivity and to avoid undesired color interferences. The hard lacquer layer is applied on the substrate body, for example, via a dipping method, a spraying method or a spin-coating method. In principle, however, it is possible also to apply the hard lacquer layer to the substrate body by some other known method.

The hard lacquer layer is produced from a sol-gel hard lacquer composition, for example a sol-gel hard lacquer composition based on an acrylic polymer, an epoxy polymer, a urethane polymer, a melamine polymer, or else an inorganic material, in particular a quartz-based inorganic material, for example siloxane. The material for the sol-gel hard lacquer composition can also be an organically modified ceramic in which, instead of an oxygen atom, a metal atom, for instance titanium, is incorporated into a polysiloxane matrix. In accordance with one particularly preferred embodiment, the sol-gel hard lacquer composition is an inorganic-organic silicone resin.

An optical element according to the invention preferably has a coating having a scratch resistance corresponding to a Bayer number $Z_B$ where $Z_B \geq 8$, preferably $Z_B \geq 10$, in particular $Z_B \geq 14$, that is determined in an extended Bayer test and characterizes the scratch resistance of a coating.

An extended Bayer test for characterizing the scratch resistance of a coating of an optical element is understood here to mean the scratch resistance test—described below—from Colts Laboratories for spectacle lenses, this test being correspondingly applied to such a coating: during this test, a specific quantity of sharp-edged particles are led over the surface of the spectacle lens and the spectacle lens is subsequently evaluated optically. During the Bayer test from Colts Laboratories, for this purpose an abrasive material is led over test lenses and reference lenses in the form of uncoated spectacle lenses made of the plastic CR39 (poly (allyl diglycol carbonate)) having an optical power of 0 diopters, the lenses being fixed to a bottom of a small trough, via lateral movement of the trough. The test lenses are subsequently evaluated by measurement of the quantity of scattered light generated by the scratching. The result of the test is a number indicating how much more durable the test lens is compared with the reference lens made of the uncoated material CR39, that is poly(allyl diglycol carbonate).

An optical element according to the invention can have in particular a coating applied to the plastic body and containing at least one antireflection coating having at least one layer which is preferably densified via ion bombardment, preferably via ion bombardment at an ion current density $I \geq 30$ μA/cm$^2$ at the location of the partial layer during the duration of a vapor deposition process for making the partial layer.

In the case of an optical element according to the invention, therefore, the antireflection coating applied to the hard lacquer layer can have a single- or multilayered construction. Preferably, a two-, three-, four-, five- or six-layered construction is chosen for an antireflection coating. In the case of antireflection coatings having a two or multilayered construction, an advantageous layer sequence is one in which a layer having a high refractive index adjoins a layer having a low refractive index. In other words, for such a multilayered construction it is expedient for layers having a low refractive index and layers having a high refractive index to alternate. In addition, it is possible to provide further layers, for example adhesive layers (for example having a thickness in a range of approximately 5 nm to 5 μm), which need not have an optical function, but which can be advantageous for the resistance, adhesion properties, climate resistance, etc. By way of example, it is also possible to replace the above antireflection coating by a reflective coating including one or more reflective layers and, if appropriate, antireflection layers or to provide both an antireflection coating and a reflective coating.

Examples of suitable materials for such an antireflection and/or reflective coating are, for example, silicon or boron, but also oxides, fluorides, silicides, borides, carbides, nitrides and sulfides of metals and nonmetals. For the coating process, these substances can be used individually or else as a mixture of two or more of the materials.

In particular, the materials SiO, SiO$_2$, ZrO$_2$, Al$_2$O$_3$, TiO, TiO$_2$, Ti$_2$O$_3$, Ti$_3$O$_4$, CrO$_x$ (where x=1-3), for example Cr$_2$O$_3$, Y$_2$O$_3$, Yb$_2$O$_3$, MgO, Nb$_2$O$_5$, Ta$_2$O$_5$, CeO$_2$ and HfO$_2$ etc., or corresponding mixed oxides, the materials MgF$_2$, AlF$_3$, BaF$_2$, CaF$_2$, Na$_3$AlF$_6$ and Na$_5$Al$_3$F$_{14}$, and the materials Cr, W, Ta and Ag, are suitable for making an antireflection coating.

A suitable antireflection and/or reflective coating can be applied by customary methods, preference being given to making the individual layers via vapor deposition, sputtering and/or via CVD methods, in particular via plasma-enhanced CVD methods. It is particularly preferred to apply an antireflection coating via deposition from a vapor phase such that a densified layer having a high abrasion resistance is formed.

The layer thickness $d_A$ of an antireflection coating having a single- or multilayered construction is not subject to any particular restriction, in principle. However, this is preferably set to a thickness $d_A$ where $d_A \leq 2000$ nm, preferably $d_A \leq 1500$ nm, particularly preferably $d_A \leq 500$ nm. However, the minimum layer thickness $d_{Am}$ of the antireflection coating is as far as possible approximately $d_{Am} \geq 100$ nm.

By way of example, such an antireflection coating can be constructed from alternating high and respectively low refractive index layers made of TiO$_2$ and SiO$_2$, including for example $\lambda/8$-TiO$_2$, $\lambda/8$-SiO$_2$, $\lambda/2$-TiO$_2$ and $\lambda/4$-SiO$_2$, wherein the layer thickness indicated here is preferably related to the wavelength $\lambda$=550 nm. Such an antireflection coating having a multilayer construction can be produced in particular via known PVD methods (Physical Vapor Deposition).

In order that the relevant coating for the optical element has a high scratch resistance, it is advantageous if the coating contains at least one quartz layer substantially consisting of SiO$_2$ or a layer consisting of a mixture of SiO$_2$ and Al$_2$O$_3$, with a layer thickness $d \geq 100$ nm.

The inventors have recognized that the constitution of the surface of the hard lacquer layer, in particular the interfacial energy $\sigma_s$ of the surface, plays a crucial part for the diffusivity $D_F$ of a coating including further layers applied to the hard lacquer layer, such as partial layers for an antireflection coating applied to the hard lacquer layer.

The interfacial energy $\sigma_s$ of the surface of a substrate is a measure of the energy expenditure required to alter the surface. It is determined by the intermolecular forces at the surface, which can be decomposed into a dispersive component attributed to the intermolecular van der Waals forces, and a polar component caused by permanent dipole moments of molecules in the hard lacquer layer.

The interfacial energy $\sigma_s$ of a surface, as described, for example, in the publication Kui-Xiang Ma et al., Investigation of surface energy for organic light emitting polymers and indium tin oxide, Thin Solid Films, 140 371 (2000), can therefore be decomposed into a dispersive component $\sigma_s^{dispersive}$ caused by the permanent dipoles of the molecules and a polar component $\sigma_s^{polar}$ caused by the van der Waals forces.

The inventors have discovered that if the contribution of the polar component $\sigma_s^{polar}$ to the interfacial energy $\sigma_s = \sigma_s^{dispersive} + \sigma_s^{polar}$ of the hard lacquer layer is as high as possible, the diffusivity of a coating including one or more partial layers of an antireflection coating applied on the hard lacquer layer can be decisively increased.

According to the invention, that is achieved, in particular, by treating the hard lacquer layer on the substrate with a corona discharge.

When the hard lacquer layer on the substrate is treated with a corona discharge, the substrate with the hard lacquer layer applied thereon is brought between two electrodes in a gas atmosphere at atmospheric pressure, to which electrodes an AC voltage in the kV range is applied. In this case, the design of the electrodes is chosen such that a dielectric barrier discharge is present, in the case of which only electrons whose average free path length is small are accelerated. Here, surface modifications can be induced here not only by the corona discharge itself, but also chemically by the ozone that arises in this case.

The increase in the polar component of the interfacial energy can also be achieved according to the invention by treating the hard lacquer layer on the substrate with a low-pressure air plasma.

An optical element in the form of a spectacle lens or spectacle lens blank is placed into a plasma chamber for this purpose in a holding ring, for example in the holding ring of a washing frame. A low-pressure plasma discharge is maintained in the chamber via microwaves. The plasma thus generated is preferably a non-thermal plasma, that is the electrodes have a high temperature in the plasma, whereas the temperature of the ions in the low-pressure plasma is low. The low-pressure plasma is preferably operated in the pressure range P≈10 Pa. The plastic surfaces of the relevant spectacle lens are charged by being arranged in the plasma, such that the positive ions in the plasma are accelerated and interact with the surface of the hard lacquer. It is advantageous to provide in the plasma chamber a microwave shield, which makes it possible to arrange electrically conductive assemblies directly at the plasma chamber. Such a plasma chamber can be operated in particular with a gas atmosphere including pure oxygen, argon, a mixture of oxygen and nitrogen or a mixture of oxygen and argon.

Furthermore, one concept of the invention involves treating the hard lacquer layer with a glow discharge in order thus to increase the polar component of the interfacial energy.

For this purpose, the substrate with a hard lacquer layer applied thereon is arranged in a vacuum chamber with a low-pressure gas atmosphere, the pressure of which is in the pressure range of between 0.1 Pa and 1 Pa. The vacuum chamber contains a glow electrode for generating a glow discharge which interacts with the surface of the hard lacquer layer. The gas atmosphere in the vacuum chamber preferably consists of oxygen, argon, air or corresponding mixtures of these gases.

One concept of the invention also consists in increasing the contribution of the polar component $\sigma_s^{polar}$ to the interfacial energy $\sigma_s = \sigma_s^{dispersive} + \sigma_s^{polar}$ of the hard lacquer layer by making the hard lacquer layer from a sol-gel hard lacquer composition containing a fluorosurfactant as flow control additive. One concept of the invention further also consists in increasing the diffusivity of the coating applied to the substrate in the direction perpendicular to the surface, by introducing in the coating a multiplicity of preferably microscopic and/or mesoscopic pores, that is pores whose diameters are small compared with the wavelength of visible light, but which are very much larger than the dimensions of atoms or molecules of the order of magnitude of one or more angstroms (Å). These microscopic and/or mesoscopic pores can have the form of holes, in particular, and extend at least as far as the hard lacquer layer proceeding from the surface of the coating on the side facing away from the substrate body.

In order that these structures do not have a diffractively disturbing effect, they preferably do not form regular patterns having period lengths of the order of magnitude of the light wavelength, but rather microscopic and/or mesoscopic pores which are distributed irregularly on the relevant optical element.

In principle, the structures can also be arranged in a translationally symmetrical manner in at least one section of the coating. However, this translational symmetry is permitted to exist only on a length range whose order of magnitude is outside the wavelengths of visible light. In other words, the spatial frequency k of the arrangement of the microscopic and/or mesoscopic pores must satisfy the following relationship: $k \gg 1/400$ nm or $k \ll 1/800$ nm.

In the context of the invention, these relevant structures in the form of holes are distributed statistically over the surface for example in a manner similar to a shot charge. These holes then act as microscopic and/or mesoscopic diffusion channels. The latter are so densely situated that the swelling processes no longer give rise to macroscopic local corrugations which appear in an optically disturbing manner or as a consequence of which the antireflection layers are locally deformed so much that their adhesion to the underlying layers is impaired.

In this case, the diameter $D_L$ of the holes preferably satisfies the following relationship: $D_L \leq 5$ μm, preferably $D_L \leq 1$ μm, particularly preferably $D_L \leq 0.2$ μm.

According to the invention, the mesoscopic pores are produced for example by exposure of the coating to a preferably high-energy particle beam, in particular by exposure to a particle beam containing noble gas atoms and/or carbon atoms and/or gold atoms. As an alternative thereto, it is also possible to produce the mesoscopic pores by exposure of the coating to pulsed laser light.

One concept of the invention is also adding foreign substances in the form of foreign molecules or nanoparticles on at least one inner layer of the coating, in particular on the hard lacquer layer, and/or on or in the substrate body and/or providing foreign structures on at least one inner layer of the coating, in particular on the hard lacquer layer.

The mesoscopic pores can, for example, be produced by exposure of the coating to a preferably high-energy particle beam, in particular by exposure to a particle beam containing noble gas atoms and/or carbon atoms and/or gold atoms, in order thus to obtain a high value for the diffusivity of the coating on the substrate body.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
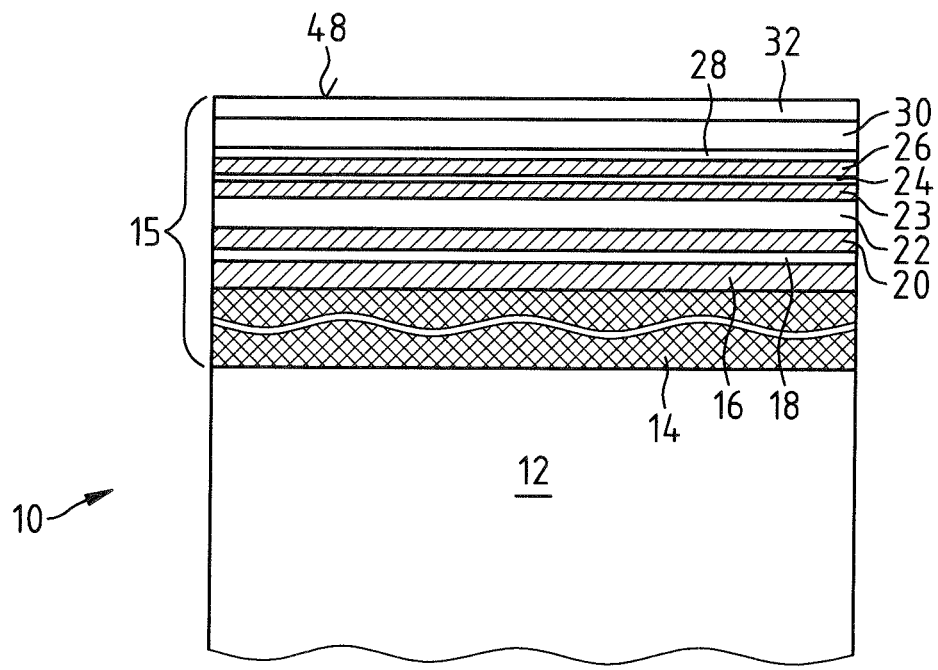
FIG. 1 shows a partial section of an optical element including a coating having a hard lacquer layer and an antireflection coating arranged thereon.

The optical element 10 shown in a partial section, which is not true to scale, in FIG. 1 has a substrate body 12 made of plastic, for example the plastic CR39. A hard lacquer layer 14 is situated on the substrate body 12 and adjoins the substrate body 12. The hard lacquer layer 14 is applied with a sol-gel hard lacquer composition that is preferably spun onto the substrate body 12 via spin coating or applied via dip coating.

On the hard lacquer layer 14 there is a coating 15 embodied as a layer stack and having an antireflection coating, which includes a plurality of partial layers, and a topcoat. This layer stack includes a layer 16 made of aluminum oxide ($Al_2O_3$) having a thickness of 57 nm, this layer being applied to the hard lacquer layer 14. A 25 nm thick layer 18 made of quartz ($SiO_2$) is situated on the layer 16. A further layer 20 made of aluminum oxide, the thickness of which is 44 nm, lies above the layer 18. The layer 20 is followed by a 61 nm thick further layer 22 made of quartz. The latter is coated with a 60 nm thick layer 23 made of aluminum oxide. A first high refractive index layer 24, which is highly refractive with respect to visible light and is made of titanium oxide and is 8.5 nm thick, is applied on the layer 23. On the layer 24 there is then applied a layer 26 made of aluminum oxide having a thickness of 45 nm, which is coated by a second high refractive index layer 28 made of titanium oxide having a thickness of 22 nm. Finally, a layer 30 made of quartz having a thickness of 106 nm is applied on the layer 28 made of titanium oxide.

The layer stack of the antireflection coating is produced in an electron beam evaporation arrangement. Such an arrangement has a vacuum chamber, in which the substrate body 12 of the optical element with the hard lacquer layer 14 applied thereon is arranged. Via an electron beam, the material of the individual layers is sequentially evaporated in the vacuum chamber, such that it deposits sequentially on the substrate body. The electron beam evaporation arrangement preferably contains an ion source, which enables the layers vapor-deposited onto the substrate body 12 to be densified during the vapor deposition.

A layer 32 is situated as a topcoat on the layer 30 of the coating 15. The layer 32 is made of a superhydrophobic material which ensures that the optical element 10 can easily be cleaned.

The material of the layer 32 is preferably a material from the class of the perfluorinated alkanes, which are then chemically coupled via a silane-functional group to the OH groups of the layer 30 constructed from quartz. These OH groups on the surface are also designated as so-called silanol groups by those skilled in the art.

A layer based on such perfluorinated molecules is abrasion-resistant on account of the chemical coupling described above, that is the functionality is not eroded even in the use situation of the spectacle lens, that is to say even after, for example, 2 years of daily cleaning by the wearer of the spectacles. On account of the chemical properties of such a topcoat, drops of water thereon form a large contact angle (>90°) with the surface. Macroscopic drops of water then bead away from the surface.

The coating 15 produced in the manner described above is highly scratch-resistant. Specifically, it has a Bayer number $Z_B$—determined by the Bayer test explained above—for which: $Z_B \leq 10$.

The coating 15 on the substrate body 12 nevertheless has a diffusivity $D_F$ which ensures the absorption of water molecules passing through the coating 15 in the substrate body 12 and the release of water molecules from the substrate body 12 through the coating 15 from an air atmosphere arranged on that side of the coating 15 which faces away from the substrate body 12 with a moisture flow density $j_D$ which, proceeding from the equilibrium state of the quantity of the water molecules collected in the substrate body 12 in an air atmosphere at 23° C. and 50% relative air humidity, brings about the setting of the equilibrium state of the quantity of the water molecules collected in the substrate body 12 in an air atmosphere at 40° C. and 95% relative air humidity within a time interval which is longer by not more than a time period having the length $\Delta t=5$ h than the time interval required for setting this equilibrium state under corresponding conditions in the case of an uncoated substrate body identical to the substrate body 12.

Figure 2:
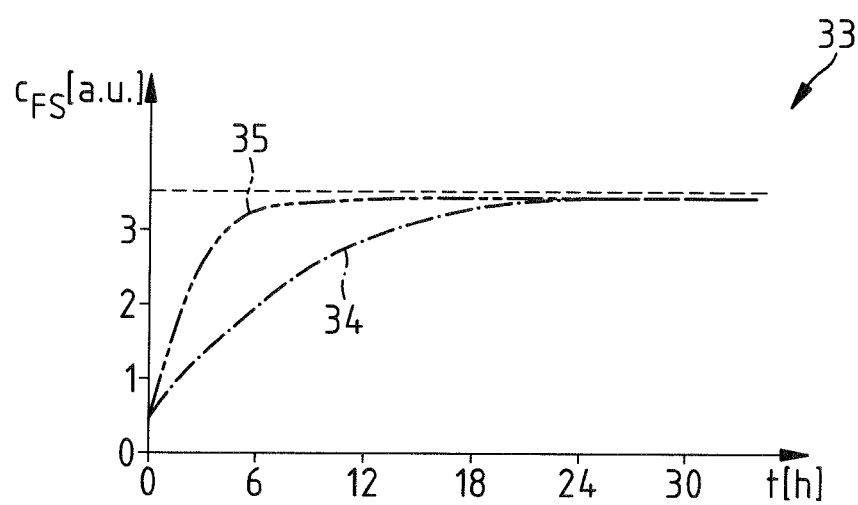
FIG. 2 shows a graph for describing the diffusivity of the coating.

FIG. 2 in the graph 33 describes the diffusivity of the coating 15 on the substrate body 12 of an optical element 10. With the curve 34, FIG. 2 shows the rise in the density $c_{FS}$ for the water molecules collected into the substrate body 12 as a function of time t, if the optical element 10, from a dry environment in which the air humidity is low, is arranged in an environment having a high air humidity. After approximately 24 h, the density $c_{FS}$ for the water molecules collected into the substrate body 12 is saturated, that is this density is then invariant with respect to time.

By contrast, the curve 35 shows the rise in the density $c_{FS}$ of the water molecules collected into an uncoated substrate body 12, which for the rest is identical to the substrate body 12 on which the curve 34 is based. As is evident from a comparison of the curves 35 and 34, although the setting of the equilibrium state for the density $c_{FS}$ is slowed down by the coating 15 of the optical element 10, the diffusivity $D_F$ of the coating is so high that it extends the length of the time interval required for setting the relevant equilibrium state by not more than 5 times the length of the time interval that is required in order that the corresponding equilibrium state is established in the case of a substrate body which is identical to the substrate body 12 but is uncoated.

This diffusivity $D_F$ of the coating is ensured in the case of the optical element 10 by virtue of the fact that the polar component $\sigma_s^{polar}$ of the interfacial energy $\sigma_s = \sigma_s^{dispersive} + \sigma_s^{polar}$ of the hard lacquer layer 14 is increased by the hard lacquer layer being treated with a corona discharge in an arrangement for generating such a corona discharge.

Figure 3:
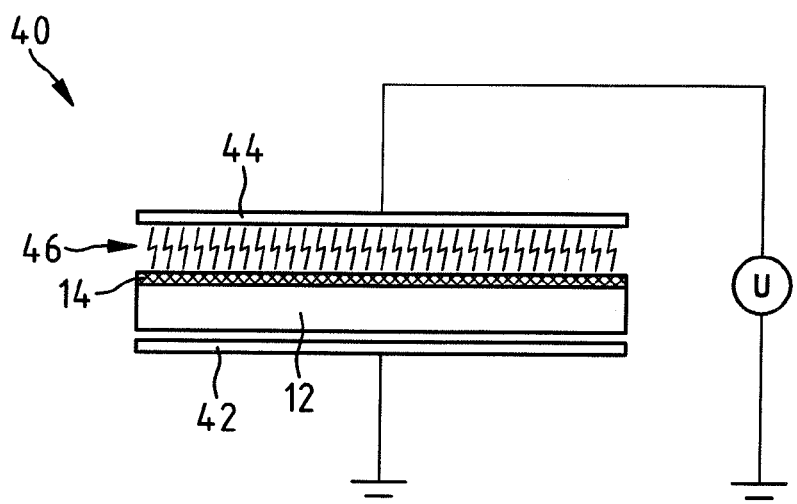
FIG. 3 shows an arrangement for treating the hard lacquer layer of an optical element with a corona discharge.

FIG. 3 shows such an arrangement 40. The arrangement 40 has a first, grounded planar electrode 42 and a further planar electrode 44, to which a high voltage $U \geq 1$ kV can be applied. Between the two electrodes 42, 44, the arrangement 40 has a receiving region for arranging a substrate body 12, on which a corresponding hard lacquer layer 14 is applied. The application of high voltage to the electrode 44 generates a shower 46 of flashes which impinges on the hard lacquer layer 14 and which, together with the ozone produced via the shower 46 of flashes, has the effect that the polar component of the interfacial energy $\sigma_s$ of the surface 48 of the hard lacquer layer 14 which faces away from the substrate body 12 is increased.

In order to ensure the desired diffusivity $D_F$ of the coating 15 in the case of the optical element 10 shown in FIG. 1, alternatively or additionally it is also possible to treat the hard lacquer layer 14 via a plasma generated in a low-pressure plasma arrangement.

Figure 4:
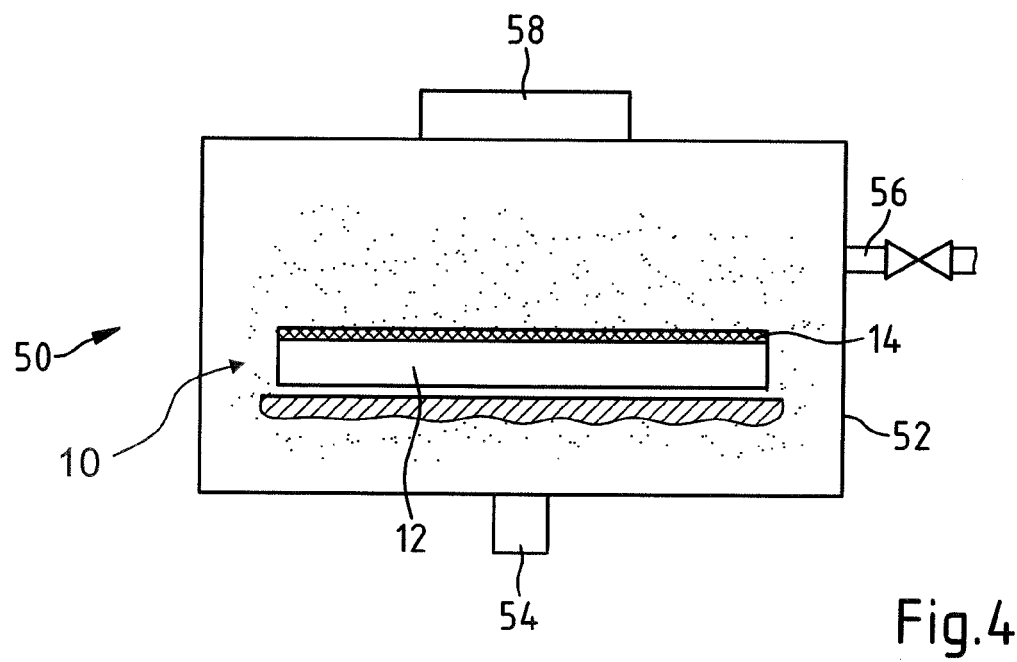
FIG. 4 shows a low-pressure plasma arrangement for generating a plasma for treating the hard lacquer layer of an optical element.

FIG. 4 shows a low-pressure plasma arrangement 50 suitable for this. The low-pressure plasma arrangement 50 has a vacuum chamber 52 with a receiving region for arranging a substrate body 12 for an optical element 10 with a hard lacquer layer 14 applied thereon. The vacuum chamber 52 has a connection 54 for a vacuum pump. The vacuum chamber 52 has a gas inlet 56, through which in particular oxygen, argon, a mixture of oxygen and nitrogen or of oxygen and argon can be introduced into the vacuum chamber 52. The low-pressure plasma arrangement 50 contains a microwave generator 58, via which the vacuum chamber 52 can be exposed to microwaves in order, at a pressure P in the vacuum chamber 52 of P≈10 Pa, to ignite a plasma that is used for treating the hard lacquer layer 14 on the substrate body 12.

Alternatively or additionally it is also possible to treat the hard lacquer layer 14 on a substrate body 12 via a plasma generated via a glow discharge in a vacuum chamber, in order to ensure the desired diffusivity $D_F$ of the coating 14 in the case of the optical element 10 shown in FIG. 1.

Figure 5:
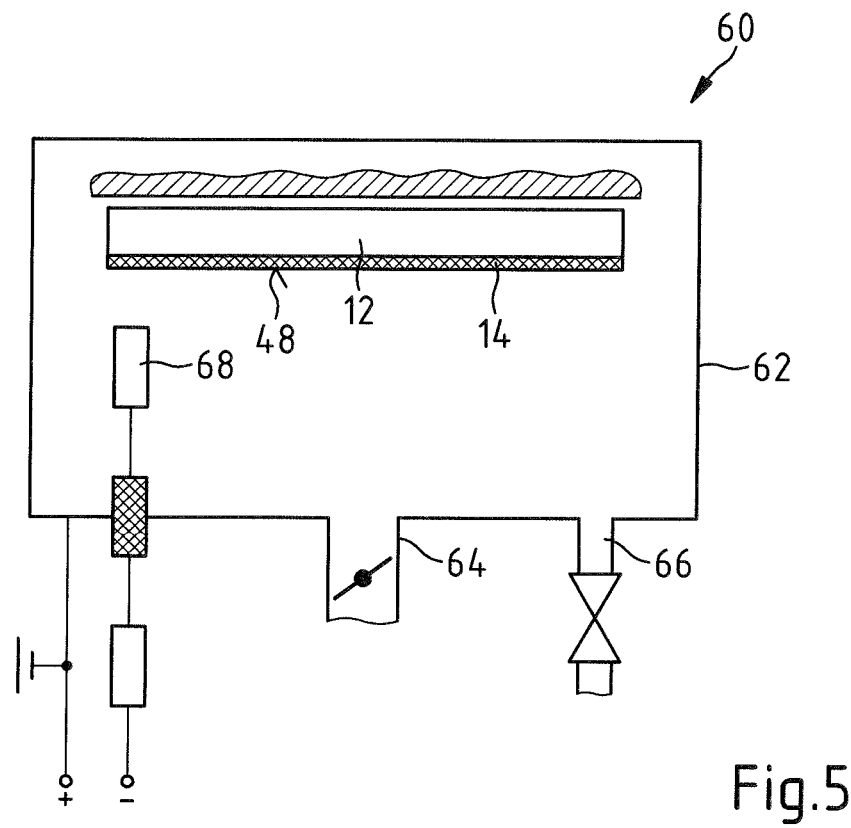
FIG. 5 shows an arrangement for generating a plasma for treating the hard lacquer layer with a glow discharge.

FIG. 5 shows such an arrangement 60. In the arrangement 60 there is a vacuum chamber 62 having electrically conductive walls and a receiving region for arranging a substrate body 12 with a hard lacquer layer 14. The vacuum chamber 62 has a connection 64 for a vacuum pump and has a gas inlet 66. In the arrangement 60 there is a glow electrode 68, to which a high voltage $U \geq 1$ kV can be applied, in order to ignite a plasma for treating the surface 48 of the hard lacquer layer 14 in a gas atmosphere which includes oxygen, argon, air or corresponding mixtures and the pressure P of which is in a pressure range of between 0.1 Pa and 1 Pa.

In order to ensure the desired diffusivity $D_F$ of the coating 15 in the case of the optical element 10 shown in FIG. 1, it is also possible, however, for the hard lacquer layer 14 to be produced from a sol-gel hard lacquer composition containing a fluorosurfactant as a flow control additive.

The table below compares the interfacial energy overall and also the dispersive component and the polar component of the interfacial energy of a hard lacquer layer—applied to a substrate body made of the material MR-8® in the form of a liquid sol-gel hard lacquer composition including the silicone-based flow control additive SF1188A from Momentive, a flow control additive based on a copolymer including a polydimethyl-siloxane and a polyoxyalkylene, and a corresponding sol-gel hard lacquer composition including the flow control additive FC-4430 from 3M, which is constructed on the basis of a fluorinated polymeric ester, that is contains fluorosurfactant:

| Sample No. | Flow control additive | $\sigma_s$ [mJ/Nm] | $\sigma_s^{dispersive}$ [mJ/Nm] | $\sigma_s^{polar}$ [mJ/Nm] |
|---|---|---|---|---|
| 1 | FC4430 | 23.89 | 21.93 | 1.96 |
| 2 | FC4430 | 23.13 | 21.10 | 2.03 |
| 3 | SF1188 | 24.42 | 23.43 | 0.99 |
| 4 | SF1188 | 24.68 | 23.49 | 1.19 |

The dispersive and polar components are measured here via the so-called OWRK method using the test liquids diiodomethane and ethylene glycol, the method being described for example in the dissertation by Carsten Weiβ, Friedrich-Alexander University Erlangen-Nuremberg (2002), published on Jul. 8, 2004, on page 54 and page 55.

The table shows that use of a flow control additive containing fluorosurfactant has the effect that the polar component of the interfacial energy of the hard lacquer layer applied to a substrate body is less than in the case of a silicone-based flow control additive.

Figure 6:
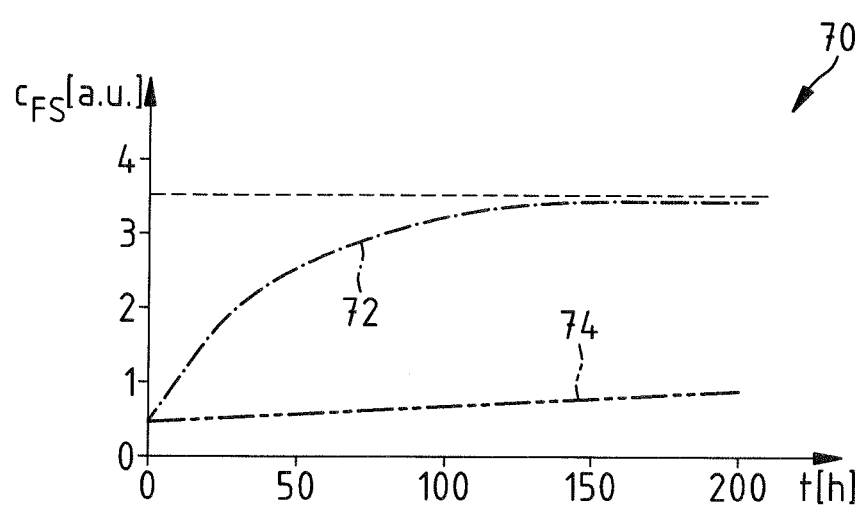
FIG. 6 shows the dependence of the diffusivity of the coating on the polar component of the interfacial energy of the surface of the hard lacquer layer.

FIG. 6 with the graph 70 describes the diffusivity $D_F$ of the coating 15 of FIG. 1 on the substrate body 12 of an optical element 10. The hard lacquer layer 14 of the substrate body 12 is produced here from a sol-gel hard lacquer composition containing a fluorosurfactant as flow control additive. With the curve 72, FIG. 6 shows the rise in the density $c_{FS}$ for the water molecules collected into the substrate body 12 as a function of time t, if the optical element 10, from a dry environment in which the air humidity is low, is arranged in an environment having a high air humidity. After approximately 150 h, here the density $c_{FS}$ for the water molecules collected into the substrate body 12 is saturated, that is the quantity of the water molecules collected in the substrate body is then approximately invariant with respect to time.

By contrast, the curve 74 shows the rise in the density $c_{FS}$ of the water molecules collected into the substrate body of an optical element corresponding to the optical element 10 shown in FIG. 1, the substrate body having, however, a hard lacquer layer which corresponds to the hard lacquer layer 14 and the construction and thickness of which corresponds to the hard lacquer layer 14 in the case of the optical element 10, but which is produced from a sol-gel hard lacquer composition including a silicone-based flow control additive. As is apparent from the curve 74, the substrate body in the case of this optical element is not even close to being saturated, even after more than 200 h.

In order to obtain a high diffusivity $D_F$ for the coating 15 in the case of the optical element 10 shown in FIG. 1, it is additionally possible to add on the hard lacquer layer 14, or else other inner layers of the antireflection coating, foreign substances, in particular foreign molecules and/or foreign structures, for example nanoparticles, for instance nanoparticles made of $SiO_2$ or else nanoparticles made of polymers.

Figure 7:
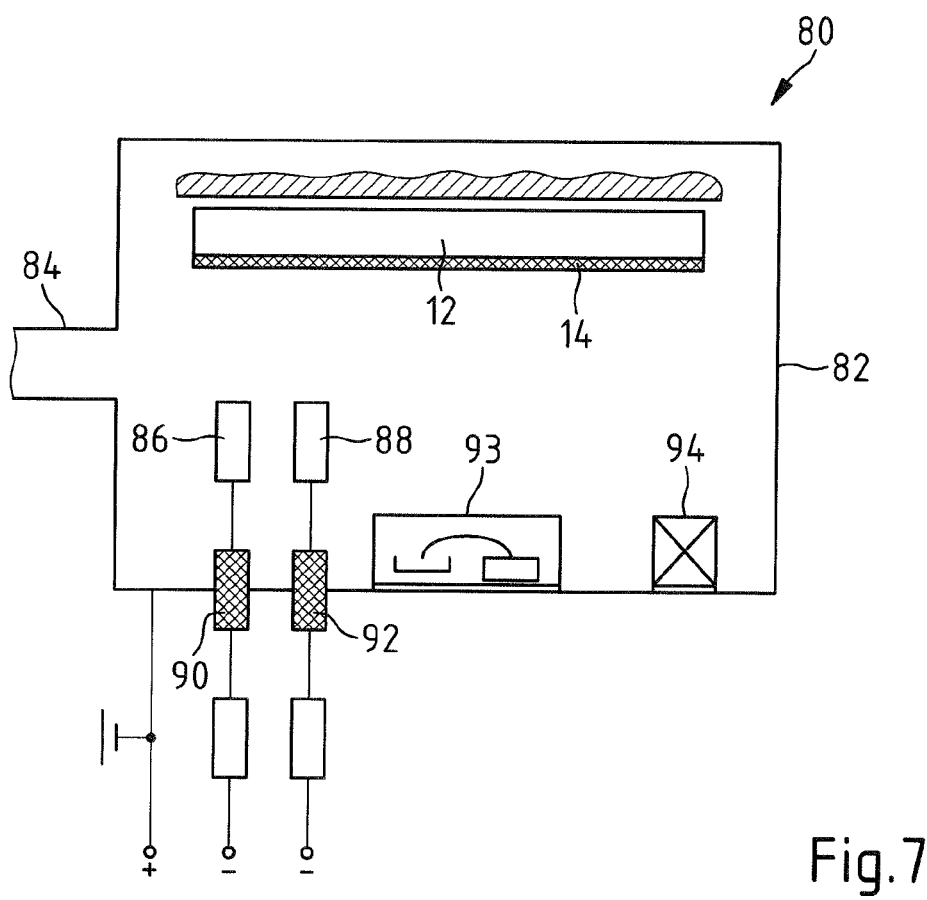
FIG. 7 shows an arrangement for applying foreign structures to the hard lacquer layer of an optical element.

FIG. 7 shows an arrangement 80 for correspondingly applying foreign structures to such a hard lacquer layer or to further layers of an optical element.

The arrangement 80 has a vacuum chamber 82 having electrically conductive walls, in which a substrate body 12 coated with a hard lacquer layer 14, for example a spectacle lens blank, can be arranged. The vacuum chamber 82 has an opening 84 for connection to a valve arrangement and vacuum pump, which make it possible to generate in the vacuum chamber 82 an exactly defined composition for a gas atmosphere which has a predefinable pressure. There are ring-shaped glow electrodes 86, 88 in the vacuum chamber 82. The glow electrodes 86, 88 are produced from a nanoparticle material. The glow electrodes 86, 88 are connected to a device for providing a high voltage via bushings 90, 92 in the wall of the vacuum chamber 82. As a result of a high voltage being applied to the glow electrodes 86, 88, in the vacuum chamber 82 it is possible to ignite a glow discharge in the case of which the nanoparticle material of the glow electrodes is sputtered onto the hard lacquer layer 14 at a pressure of for example $10^{-4}$ mbar, such that they are added there.

It should be noted that the arrangement 80 is also suitable, in principle, for applying partial layers for an antireflection coating to the hard lacquer layer 14 with nanoparticles added thereon. For this purpose, an electron beam evaporator 93 is arranged in the arrangement 80, via which electron beam evaporator the different materials for layers in an antireflection coating can then be vapor-deposited onto the substrate body 12. In order to densify the layers vapor-deposited onto the substrate body 12, an ion source 94 is also preferably integrated into the arrangement 80. The ion source is configured in such a manner that it enables an ion bombardment of the substrate body 12 during the vapor deposition of coatings with an ion energy $E_I$ which can be set in an expedient manner and is preferably in a range of 1 eV $\leq E_I \leq$ 100 eV.

It should be noted that the glow electrodes 86, 88 in the vacuum chamber 82 must be sufficiently close to the substrate body 12, in order that the corresponding nanoparticles can deposit uniformly on the substrate body and in this case are nevertheless scattered individually thereon, such that they are not visible.

Corresponding nanoparticle coverings are known, for example, as disturbing effects of glow lamps that have long been used in vapor-deposited layers. Here, however, there is a desire to produce them with a much lower density than is the case for a glow lamp that has long been used. Furthermore, it is endeavored, of course, to be able to produce these nanoparticle coverings appropriately rapidly.

Unlike in the case of a glow lamp, therefore, here an electrode material is chosen which sputters relatively well at the glow discharge voltage and the residual gas pressure to be set. Furthermore, the electrode material is chosen here such that the layers deposited thereabove in the case of the relevant optical element 10 are influenced by the electrode material locally particularly effectively with impurities. The choice of suitable materials for the nanoparticles, the gas type for the residual gas to be ionized, the pressure to be set and the voltage for the glow discharge are dependent here on the desired construction of the layers, in particular on the desired construction of that layer which is vapor-deposited directly onto the nanoparticles.

As an alternative to applying impurity particles to a hard lacquer layer 14, it is also possible, prior to the vapor deposition of a layer in a corresponding vacuum arrangement, to deposit foreign substances or foreign structures (for example molecules or nanoparticles), as impurities or seeds for impurities on the surface and then later to carry out vapor deposition over them. This can, for example, also be effected by introducing finely dispersed substances beforehand into the material, for example the basic material of the substrate body 12, for instance into a spectacle lens, or else into the hard lacquer layer, if it is endeavored to modify the properties of the layer, which substances, provided that they lie at the surface, locally influence the chemical bonding force of the layer to be applied, such that, at the locations at which the particles made of the basic material lie at the surface, impurities are brought about in the vapor-deposited layer.

Furthermore, for substances which are already finely dispersed in a hard lacquer layer or a basic material, in a defined process step it is possible to initiate a chemical reaction which ensures that superficially finely dispersed isolated locations arise at which a layer vapor-deposited at such a location has a gap.

Via impurity particles applied externally in this way or an externally induced chemical reaction, it is possible, in particular in a vapor-deposited anti-reflection coating, thus to produce impurities which can significantly increase the diffusivity $D_F$ of a coating 15 of an optical element 10.

It should also be noted that the diffusivity $D_F$ of a coating 15 of an optical element 10 can also be obtained via a targeted modification of the surface chemistry and energy. Such a modification of an interface in the case of an optical element 10 can furthermore, for example, also be produced with coatings which are produced using wet-chemical or physical methods. Furthermore, such interfaces can also be modified via printing, for instance via nano-imprints, or else by bombardment with high-energy particles.

It should be stated in this connection that nanoparticles can be deposited on a layer applied to a substrate body 12, in principle, also via the electron beam evaporator 93 in the arrangement 80.

Moreover, it should be noted that it is also possible, in principle, to incorporate into a coating in a targeted manner impurities in the form of foreign substances which increase the diffusivity $D_F$ of the coating.

Figure 8:
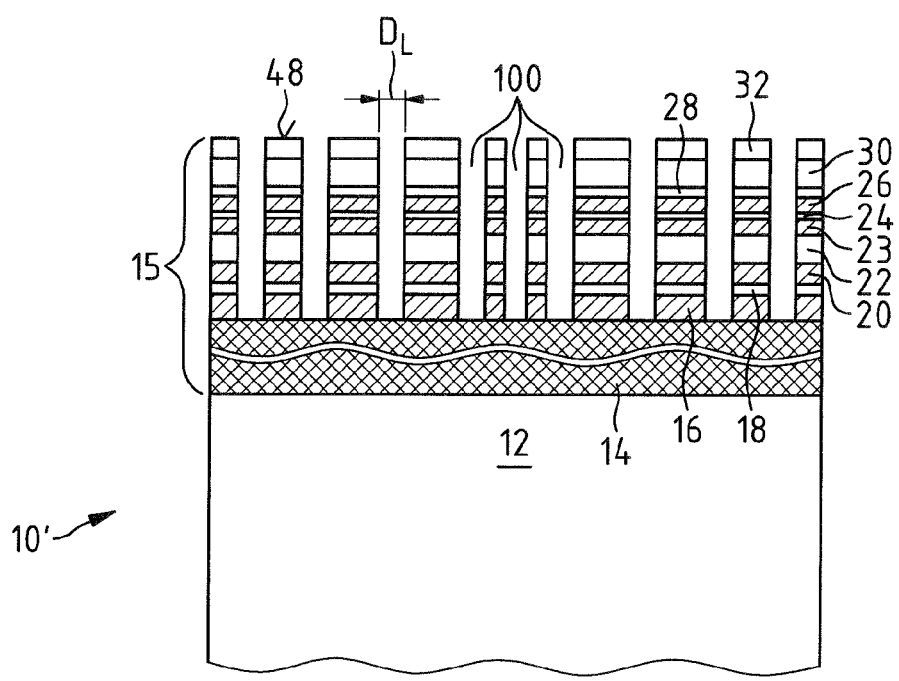
FIG. 8 shows a partial section of a further optical element including a hard lacquer layer and partial layers of an antireflection coating that are arranged thereon and pervaded by holes.

FIG. 8 shows a further optical element 10', as a partial section, the optical element including a substrate body 12 made of plastic, for example made of the plastic CR39. Insofar as the construction of the optical element 10' corresponds to the construction of the optical element 10 from FIG. 1, this is identified in FIG. 8 via the numbers used in FIG. 1 as reference signs.

Unlike the optical element 10 from FIG. 1, the optical element 10' contains a multiplicity of holes 100. The holes 100 extend from the surface 48 of the coating 15 to the hard lacquer layer 14. However, the hard lacquer layer 14 is not pervaded by the holes 100. The holes 100 act as microscopic and/or mesoscopic pores in the coating 15 which increase the diffusivity $D_F$ thereof. In this case, the diameter $D_L$ of the holes satisfies the following relationship: $D_L \leq 5$ µm.

The holes 100 in the coating 15 of the optical element 10' are made, for example, by a focused electron or ion beam in a vacuum chamber.

Figure 9:
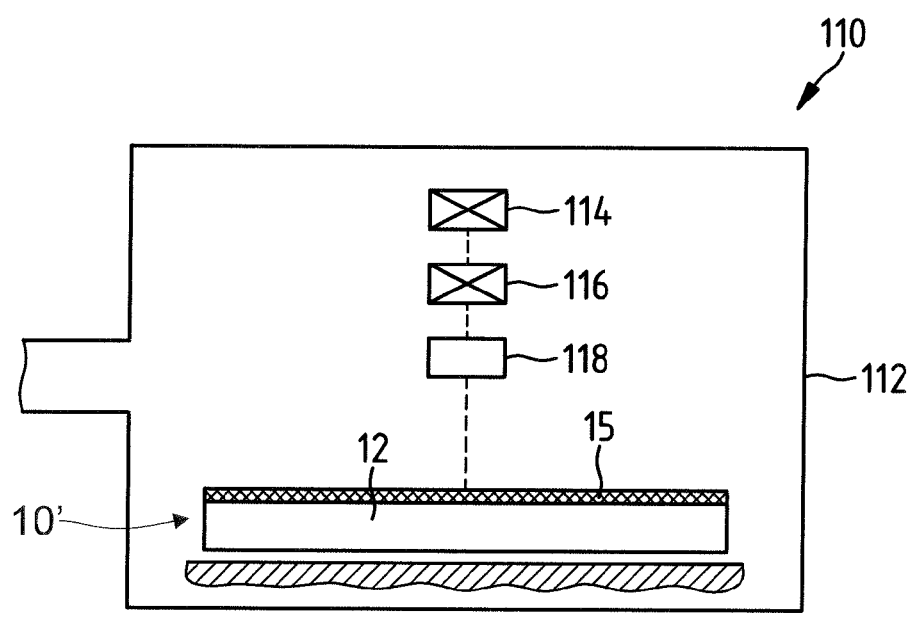
FIG. 9 shows an arrangement for making the holes in the partial layers of an antireflection coating via particle bombardment; and, FIG. 10 shows an arrangement for making the holes in the partial layers of an antireflection coating via laser light.

FIG. 9 shows an arrangement 110 for making the above-described microscopic and/or mesoscopic pores in the coating 15. The arrangement 110 has a vacuum chamber 112, in which an electron and/or ion source 114 is arranged. The electron and/or ion source 114 is assigned an acceleration unit 116 and a deflection unit 118. The electron and/or ion source 114 serves for exposing the coating 15 of an optical element 10' arranged in the vacuum chamber 112 to a particle beam of electrons and/or ions.

With the particle beam, the electrons or ions are shot in a statistically distributed manner onto the surface of the optical element 10' to be treated, such that the entire surface 48 is strewn with diffusive holes.

That need not take place with a single particle rather it can also occur sequentially by the deflection positions being left unchanged in each case for long enough. In order to produce a plurality of holes simultaneously, for example an electron- or ion-optically diffractive structure can also be arranged in front of the deflection unit.

The acceleration unit 116 ensures that the electrons or ions have sufficiently high energy in order that they perforate a coating 15 to be modified with regard to its diffusion properties, such that the layers which otherwise act as a diffusion barrier therein become more permeable.

In principle, the perforation of layers in the coating 15 and the application of different layers can also be combined in one arrangement 110. This measure affords the advantage that corresponding holes can be produced with a lower energy of the electrons and/or ions.

In this case, the deflection unit 118 controls the particle beam provided by the electron and/or ion source 114 preferably via a random number generator. What can thus be achieved is that the holes 100 produced in the coating 15 of an optical element 10' in the arrangement 110 are distributed approximately statistically over the area, such that the microscopic and/or mesoscopic structures of the holes do not generate discernible diffraction phenomena under visible light.

Another way of simultaneously making a multiplicity of holes via ion bombardment consists in providing in front of the actual ion source a plate having a multiplicity of statistically distributed holes, which acts as a perforated diaphragm. This perforated diaphragm is then imaged ion-optically onto the surface of the relevant optical element. In this case, the optical element is exposed to the corresponding particle beam until the holes produced in the coating or a layer of the coating are deep enough to achieve the desired diffusion-influencing effect. By moving the plate or the optical element it is possible to displace the locations at which the optical element is exposed to a particle beam.

It should be noted that the electrons or ions must have a sufficiently high kinetic energy above the destruction threshold of the surface to be processed. In the case of bombardment with ions, the choice of the type of ions can also influence the effect.

It should also be noted that in principle a regular pattern of "holes" or disturbances can also be produced in a coating 15 of an optical element 10 via a focused electron or ion beam. Such patterns could arise for example by virtue of the focused electron or ion beam itself being an interference figure and therefore including a regularity: this has the advantage over the explanation given above that with one "focal process" a multiplicity of holes can be produced all at once by the relevant individual interference figures being positioned alongside one another step by step in order thus to cover the entire optical element, that is the spectacle lens, for example. For the case where the extent of the imaged interference figures or the focusing conditions does/do not permit the entire optical element to be covered all at once, care must be taken to ensure that the interference figure projected onto the optical element has a period length either small enough or large enough that a discernible diffraction no longer occurs: period lengths of the order of magnitude of the light wavelength should therefore be avoided in the case of the projected patterns.

Figure 10:
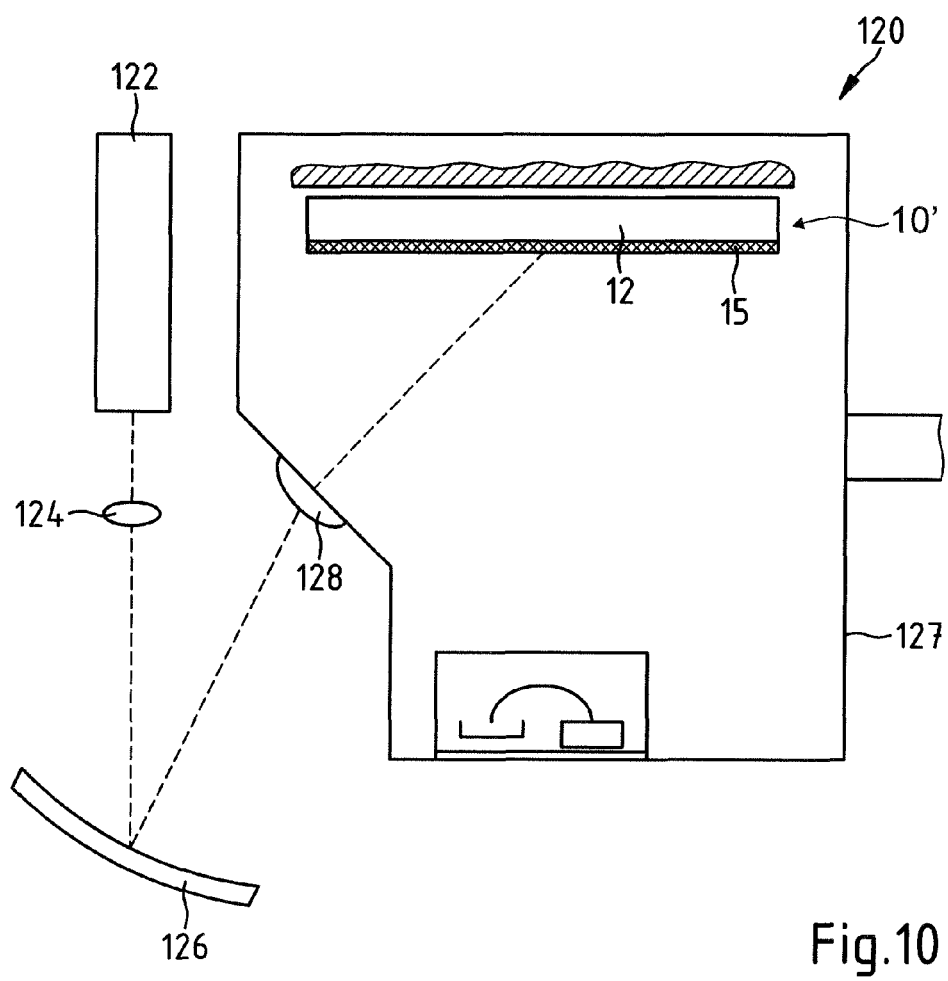

FIG. 10 shows a further arrangement 120 for making the above-described microscopic and/or mesoscopic pores in the coating 15 of an optical element 10'.

The arrangement 120 includes a laser 122 for generating pulsed laser light, for the pulse duration $t_p$ of which the following preferably holds true: $t_p \leq 15$ ns. The laser beam is directed through an optical unit 124 onto a highly reflective target 126, which acts as an amplitude object or preferably as a pure phase object and generates a speckle pattern on the optical element 10'.

The arrangement 120 includes a vacuum chamber 127 having an optical window 128, which acts as a lens. Through the window 128 the laser light from the laser 122 is directed onto the optical element 10' arranged in the vacuum chamber 127. In this case, the wavelength of the laser light is chosen such that the latter is absorbed in the coating 15 of the optical element 10' and in the process generates corresponding holes 100 in the coating 15.

Further modifications and embodiments of the invention arise as a result of combination of different features of the exemplary embodiments described above. It should also be noted that an optical element according to the invention can be embodied in particular as a lens, as a spectacle lens, or else as a spectacle lens blank or a spectacle lens semifinished product. To summarize, in particular the following preferred features of the invention should be emphasized. An optical element 10, 10', for example a spectacle lens or spectacle lens blank, has a substrate body 12, which is produced from a plastic that is transparent preferably in the visible spectral range, and a coating 15 having a plurality of layers 14, 16, 18, the coating 15 including a hard lacquer layer 14 adjoining the substrate body 12. The coating 15 has a diffusivity $D_F$ which ensures the absorption of water molecules passing through the coating 15 in the substrate body 12 and the release of water molecules from the substrate body 12 through the coating 15 from an air atmosphere arranged on that side of the coating 15 which faces away from the substrate body 12 with a moisture flow density $j_D$ which, proceeding from the equilibrium state of the quantity of the water molecules collected in the substrate body 12 in an air atmosphere at 23° C. and 50% relative air humidity, brings about the setting of the equilibrium state of the quantity of the water molecules collected in the substrate body 12 in an air atmosphere at 40° C. and 95% relative air humidity within a time interval which is longer by not more than a time period having the length $\Delta t=10$ h, preferably by not more than a time period having the length $\Delta t=9$ h or $\Delta t=8$ h or $\Delta t=7$ h or $\Delta t=6$ h or $\Delta t=5$ h or $\Delta t=4$ h or $\Delta t=3$ h or $\Delta t=2$ h, particularly preferably by not more than a time period having the length $\Delta t=1$ h, than the time interval required for setting this equilibrium state under corresponding conditions in the case of an uncoated substrate body identical to the substrate body 12.

It is understood that the foregoing description is that of the preferred embodiments of the invention and that various changes and modifications may be made thereto without departing from the spirit and scope of the invention as defined in the appended claims.

| LIST OF REFERENCE NUMERALS: | |
|---|---|
| 10, 10' | Optical element |
| 12 | Substrate body |
| 14 | Hard lacquer layer |
| 15 | Coating |
| 16, 18, 20, 22, 23, 24, 26, 28, 30, 32 | Layers |
| 33 | Graph |
| 34, 35, 72, 74 | Curves |
| 40, 60, 80, 110, 120 | Arrangement |
| 42, 44 | Electrodes |
| 46 | Shower of flashes |
| 48 | Surface |
| 50 | Low-pressure plasma arrangement |
| 52, 62, 82, 112, 127 | Vacuum chamber |
| 54, 64 | Connection |
| 56 | Gas inlet |
| 58 | Microwave generator |
| 60, 80, 110, 120 | Arrangement |
| 66 | Gas inlet |
| 68, 86, 88 | Glow electrode |
| 70 | Graph |
| 84 | Opening |
| 90, 92 | Bushings |
| 93 | Electron beam evaporator |
| 94 | Ion source |
| 100 | Holes |
| 114 | Electron and/or ion source |
| 115 | Coating |
| 116 | Acceleration unit |
| 118 | Deflection unit |
| 122 | Laser |
| 124 | Optical unit |
| 126 | Target |
| 128 | Window |

What is claimed is:

1. An optical element comprising:
   a substrate body made of a plastic transparent in the visual spectral region;
   a coating having a plurality of layers including a hard lacquer layer adjoining said substrate body and further having a first side facing away from said substrate body;
   said coating having a diffusivity ($D_F$) configured to ensure an absorption of water molecules passing through said coating into said substrate body and a release of water molecules from said substrate body through said coating from an air atmosphere arranged on said first side of said coating;
   said air atmosphere having a moisture flow density ($j_D$);
   said diffusivity ($D_F$) being further configured to, starting from a first equilibrium state of the amount of water molecules absorbed in said substrate body at an air atmosphere at 23° C. and 50% relative humidity, effect a setting of a second equilibrium state of the amount of water molecules absorbed in said substrate body at an air atmosphere at 40° C. and 95% relative humidity within a first time interval; and, said first time interval being at most ten hours longer than a second time interval required for a setting of said second equilibrium state starting from said first equilibrium state in an uncoated substrate body identical to said substrate body.

2. The optical element of claim 1, wherein said hard lacquer layer is treated on said substrate body with a corona discharge.

3. The optical element of claim 1, wherein said hard lacquer layer is treated on said substrate body with a low-pressure air plasma.

4. The optical element of claim 1, wherein said hard lacquer layer is treated on said substrate body with a glow discharge.

5. The optical element of claim 1, wherein said hard lacquer layer is made with a sol-gel hard lacquer composition including a fluorosurfactant as a flow control additive.

6. An optical element comprising:
a substrate body made of a plastic transparent in the visual spectral region;
a coating having a plurality of layers including a hard lacquer layer adjoining said substrate body and further having a first side facing away from said substrate body;
said coating having a diffusivity ($D_F$) configured to ensure an absorption of water molecules passing through said coating into said substrate body and a release of water molecules from said substrate body through said coating from an air atmosphere arranged on said first side of said coating;
said air atmosphere having a moisture flow density ($j_D$);
said diffusivity ($D_F$) being further configured to, starting from a first equilibrium state of the amount of water molecules absorbed in said substrate body at an air atmosphere at 23° C. and 50% relative humidity, effect a setting of a second equilibrium state of the amount of water molecules absorbed in said substrate body at an air atmosphere at 40° C. and 95% relative humidity within a first time interval;
said first time interval being at most ten hours longer than a second time interval required for a setting of said second equilibrium state starting from said first equilibrium state in an uncoated substrate body identical to said substrate body;
wherein said hard lacquer layer is treated on said substrate body with a corona discharge or a low-pressure air plasma or a glow discharge, or wherein said hard lacquer layer is made with a sol-gel hard lacquer composition including a fluorosurfactant as a flow control additive;
said coating includes at least one anti-reflection coating having at least one part-layer which was vapor deposited in a vacuum chamber; and,
said part-layer being compressed via ion bombardment.

7. The optical element of claim 6, wherein said first time interval is at most nine, eight, seven, six, five, four, three or two hours longer than the second time interval.

8. The optical element of claim 6, wherein said first time interval is at most one hour longer than the second time interval.

9. The optical element of claim 6, wherein said coating has a scratch-resistance corresponding to a Bayer value ($Z_B$) as determined in an expanded Bayer-test characterizing the scratch resistance of said coating, wherein $Z_B \geq 8$.

10. The optical element of claim 9, wherein $Z_B \geq 14$.

11. The optical element of claim 6, wherein said part-layer is compressed via an ion bombardment at $I \geq 30$ µA/cm² at the location of the part-layer during the duration of a vapor depositing process for generating said part-layer.

12. The optical element of claim 6, wherein said coating includes at least one of a quartz layer made essentially of $SiO_2$ with a layer thickness $d \geq 100$ nm and a mixed layer made of $SiO_2$ and $Al_2O_3$ with a layer thickness $d \geq 100$ nm.

13. The optical element of claim 6, wherein said coating has a plurality of pores.

14. The optical element of claim 13, wherein said pores are at least one of microscopic and mesoscopic.

15. The optical element of claim 13, wherein:
said coating defines a coating surface at said first side; and,
said pores are configured as holes extending from said coating surface at least to said hard lacquer layer.

16. The optical element of claim 15, wherein said holes have a diameter $DL \leq 5$ µm.

17. The optical element of claim 15, wherein said holes have a diameter $DL \leq 0.2$ µm.

18. The optical element of claim 14, wherein said pores are arranged irregularly in said coating.

19. The optical element of claim 14, wherein said pores are arranged in a translationally symmetrical manner with a spatial frequency (k) and said spatial frequency (k) is at least one of $k \gg 1/400$ nm and $k \ll 1/800$ nm.

20. The optical element of claim 14, wherein said mesoscopic pores are made by an application of a particle beam to at least one of said coating and at least one of said layers of said coating.

21. The optical element of claim 20, wherein said particle beam includes at least one of noble gas atoms, carbon atoms and gold atoms.

22. The optical element of claim 14, wherein said mesoscopic pores are made by an application of pulsed laser light to at least one of said coating and at least one of said layers of said coating.

23. The optical element of claim 6, wherein said plurality of layers includes at least one interior layer, the optical element further including:
foreign matter deposited on at least one of said interior layer and said hard lacquer layer; and,
said foreign matter being at least one of foreign molecules and nano-particles.

24. The optical element of claim 6, wherein said plurality of layers includes at least one interior layer, the optical element further including:
a foreign structure applied to at least one of said interior layer and said hard lacquer layer.

25. A method for making an optical element or component comprising the steps of:
providing a substrate body made from a transparent plastic;
applying a coating having a plurality of layers on the substrate body, the coating including a hard lacquer layer which adjoins the substrate body and is generated by applying a sol-gel hard lacquer composition onto the substrate body, the coating having a further optical layer configured as at least a part-layer of an antireflection coating and arranged on the hard lacquer layer; and,
at least one of:
depositing foreign structures on the hard lacquer layer prior to the application of the further optical layer;
attaching foreign structures to an interior layer of the coating via at least one of laser light and printing;
applying the sol-gel hard lacquer composition with fluorosurfactant as a flow control additive; and, generating a plurality of pores in the coating extending from the surface of the coating facing away from the substrate up to at least the hard lacquer layer.

26. The method of claim 25 further comprising the step of treating the hard lacquer layer with at least one of a corona discharge, a low-pressure air plasma and a glow discharge prior to the application of the further optical layer.

27. The method of claim 25, wherein said pores are configured as holes.

* * * * *

UNITED STATES PATENT AND TRADEMARK OFFICE
CERTIFICATE OF CORRECTION

PATENT NO.       : 9,778,484 B2
APPLICATION NO.  : 14/270923
DATED            : October 3, 2017
INVENTOR(S)      : Norbert Hugenberg Page 1 of 1

It is certified that error appears in the above-identified patent and that said Letters Patent is hereby corrected as shown below:

In the Specification

In Column 9:
Line 52: delete "$Z_B \leq 10$" and insert -- $Z_B \geq 10$ --

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*